May 12, 1959      D. W. CRAWFORD      2,886,375
DETACHABLE TOP FOR PICKUP TRUCK BODIES
Filed Nov. 29, 1955      3 Sheets-Sheet 1
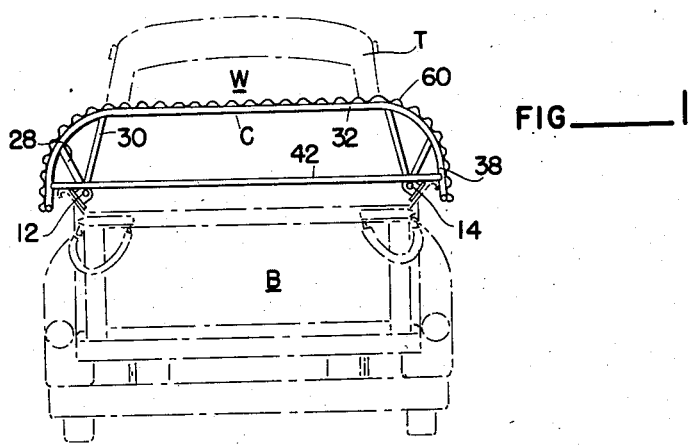
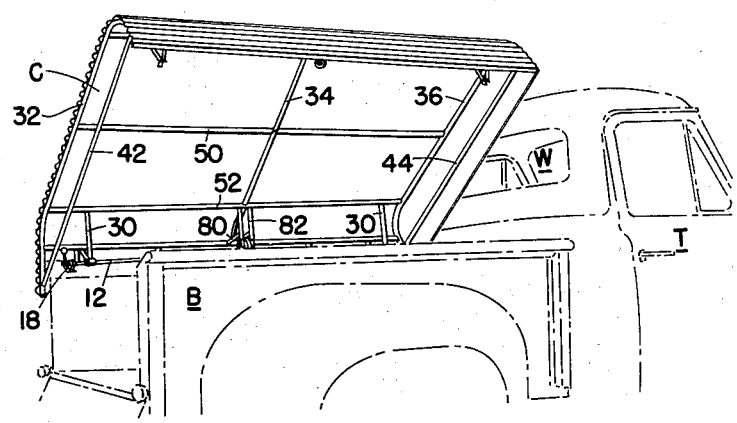
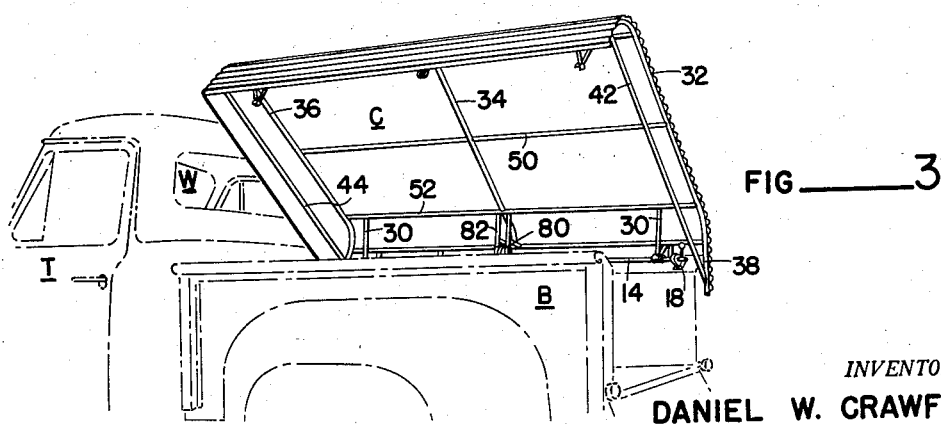
INVENTOR.
DANIEL W. CRAWFORD
BY
Smith & Tuck

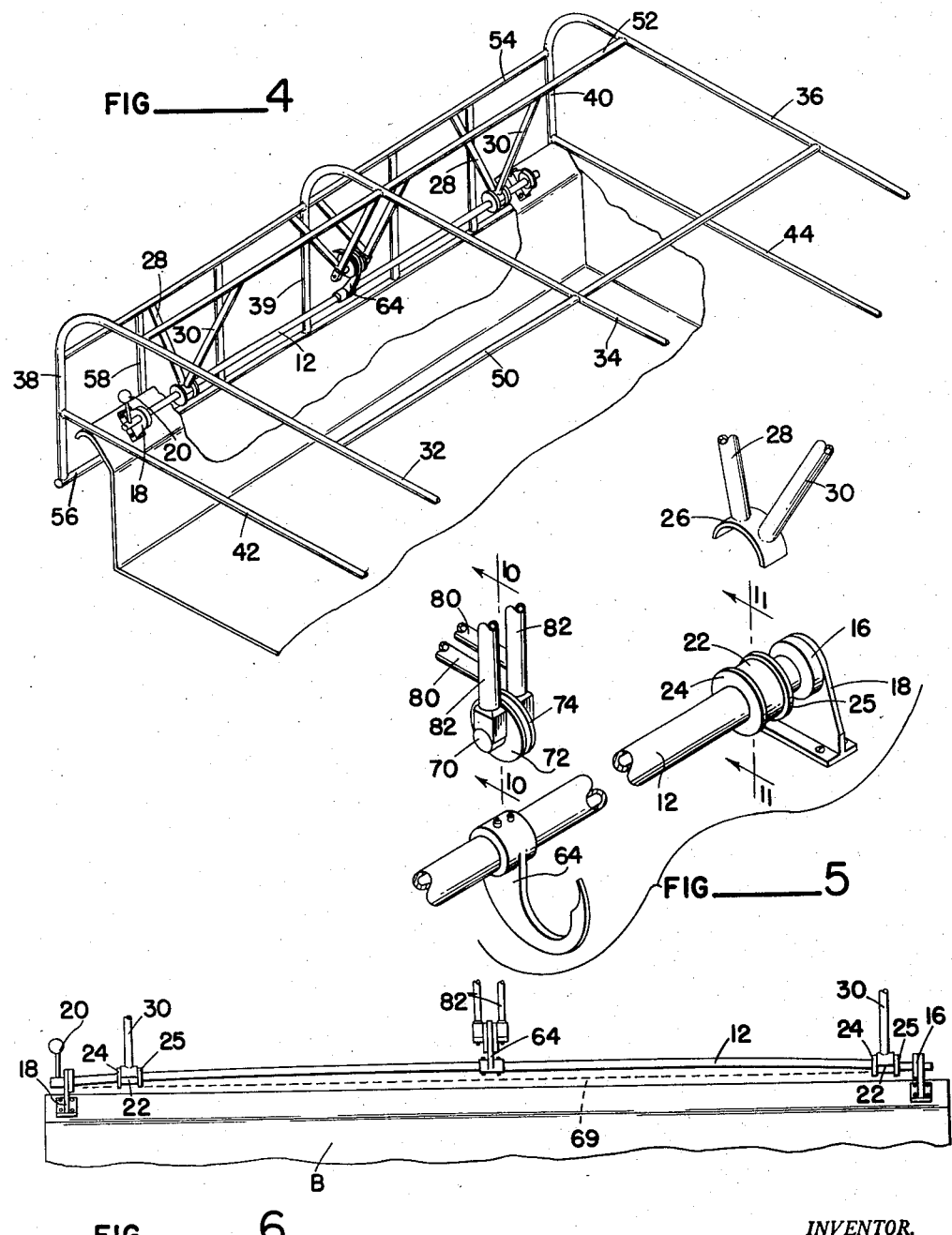

May 12, 1959　　　D. W. CRAWFORD　　　2,886,375
DETACHABLE TOP FOR PICKUP TRUCK BODIES

Filed Nov. 29, 1955　　　　　　　　　　3 Sheets-Sheet 3

*INVENTOR.*
DANIEL W. CRAWFORD
*BY*
*Smith & Tuck*

United States Patent Office 2,886,375
Patented May 12, 1959

2,886,375

DETACHABLE TOP FOR PICKUP TRUCK BODIES

Daniel W. Crawford, Seattle, Wash., assignor of fifty percent to Allen P. Green, Jr., Seattle, Wash.

Application November 29, 1955, Serial No. 549,656

3 Claims. (Cl. 296—100)

This present invention relates to the general art of automotive bodies, and more particularly to a detachable body intended for employment on the lighter trucks, such as the pickup trucks and which because of its peculiar arrangement can be easily opened from either side or may be quickly removed as for loading or unloading of the vehicle and then replaced and be clamped into operational position.

In the field of pickup bodies for light trucks it is increasingly more the will of the owner to have a cover on the pickup body bed so as to protect the items carried on the truck from the weather and, in some instances, from pilferage and the like. One of the outstanding advantages of the light weight pickup truck is the fact that it is generally maneuverable on about the same order as a passenger automobile, and it is common to park the same in the usual spaces reserved for automobiles of the passenger type and this calls upon the driver for the same dexterity in parking and in the general handling of his vehicle as is required for the passenger car. In order to safely drive at the speeds and under other conditions where the passenger cars are employed, it is very desirable to be able to clearly see over the truck body out the rear window of the cab. Such visibility, of course, is readily available in the average automobile and too often is not available in the pickup bodies where a cover is provided.

In the past in order to make it possible to load and unload a pickup body where a fixed covering was used, it was necessary to have the covering of considerable height so that a person could at least walk into the truck body even though in a very crouched position. Such height, of course, in the cover and the desirability of using end enclosures particularly, precluded any attempt to see through the truck body. Normally the pickup truck is of the order of half-ton or three quarter-ton, at most, capacity and this means that it is definitely a lightly loaded vehicle and normally the load does not represent much bulk. It is because of the manner in which the pickup truck is used, the load normally placed on it and the desirability for unobstructed vision that my present detachable and hinged pickup body top has been provided. My top overcomes the recognized disadvantages of the ordinary cover for a pickup body as it does not interfere with vision. It is very easy to load and unload the vehicle and the entire covering can be quickly removed as a temporary expedient for loading and unloading if desirable.

The principal object of my present invention therefore is to provide a detachable cover for a pickup truck body that makes it practical to have the same low enough over the truck body so as not to interfere with normal rearward vision of the driver.

A further object of my present invention is to provide a low detachable pickup body covering which is hinged on both side margins and may be selectively operated to be opened from either side as for loading and unloading.

A further object of my invention is to provide a detachable truck body wherein the body is adequately supported from the margins of the pickup truck bed but which is secured to the truck by two resilient points of engagement to the end that the cover may be quickly removed from the truck and when the truck has been loaded or unloaded the same can then be quickly put back in place.

A further object of this invention is to provide securing means for a detachable truck cover in which long resilient tubular members are transversely stressed so as to provide a resilient point of attachment, one on each side of the body cover to the end that any ordinary racking of the truck body as experienced in operational use, even on rough terrain, will not dislodge the cover from its fastenings.

A final object of this invention is to provide a light weight cover for an automobile pickup truck body which is characterized by the simplicity of construction to the end that it may be produced very economically and thus be available on a wide spread basis.

Further objects, advantages and capabilities will be apparent from the description and disclosure in the drawings, or may be comprehended or are inherent in the device.

In the drawings:

Figure 1 is a rear elevation of a pickup truck, shown in dashed lines, with my body cover in place;

Figure 2 illustrates my body cover hinged and opened from the left side;

Figure 3 is a view similar to Figure 2 but illustrating the cover hinged and opened from the right side for loading or unloading;

Figure 4 is a perspective view to illustrate the preferred form of framing for my top or cover;

Figure 5 is a fragmentary perspective view showing, on somewhat enlarged scale, one of the pivot members for my cover together with the centrally disposed locking means;

Figure 6 is a fragmentary longitudinal elevational view illustrating the distortion in the resilent locking bar;

Figure 7:
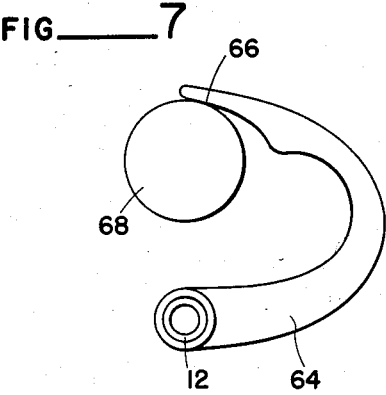
Figures 7, 8 and 9 are diagrammatic views illustrating the sequential engagement and final locking of the securing means for my top.
Figure 10:
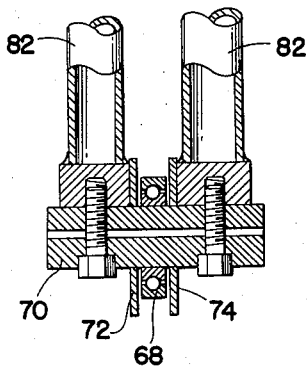
Figure 10 is an enlarged sectional view showing the anti-friction bearing means employed for the central locking members.

Referring more particularly to the disclosure in the drawings, the numerals 12 and 14 designate respectively the left and right pivot shaft members. These members are revolvably mounted as in the antibearing and housing assemblies at 16 and 18. It has been found that the preferred form of bearing at this point is the rather inexpensive ball bearings which are not made to the exacting tolerances of the heavy duty bearings and thus capable of considerable displacement of the inner races so that they take on, to a degree, the properties of the self aligning bearings which, while ideally suited for this use, would be too expensive to be used in this type of service. The shafts, as 12 and 14, should be made of tempered metal tubing. Cost normally indicates a steel tube, however, many of the aluminum alloy tubings serve this purpose very well and, of course, are light in weight. Shafts 12 and 14 are provided with operating levers, as 20, to the end that the shafts can be revolved throughout a partial revolution as is required for the latching and unlatching of the locking means. At at least two spaced points on each side shafts 12 and 14 are provided with rubber bushings as 22, which are preferably positioned and enclosed on each end by metal washers, as 24 and 25.

Adapted to engage bushings 22 are the arcuate bearing portions 26, which in turn are connected as by the tubular struts 28 and 30, to the principal frame structure of my pickup body cover.

A preferred manner of constructing my truck body cover is illustrated throughout the accompanying drawings and consists of a plurality of transverse members as 32, 34 and 36, which go entirely across the truck body and are turned down on the opposite sides as at 38, 39 and 40. The turned down portions of the two end transverse members, as 32 and 36, are preferably joined by transverse tie members, as 42 and 44. These are disposed at opposite ends of the truck body and normally do not interfere with the loading of the truck. They also provide a convenient means for positioning a closure for the ends if it should be desired. This closure is not illustrated in the accompanying drawings but it is believed it will be apparent that a plywood or metal panel could easily be inserted within the confines of the tubing assemblies 32 and 42 or 36 and 44. A plurality of longitudinal members are secured to the transverse members as by welding thereto, preferably. These members as 50, 52, 54, 56 outline the general form of the truck cover which I normally prefer to cover with corrugated sheet metal, as aluminum for instance, because of its non-corrosive properties and the fact that it is light and strong. Between members 54 and 56 and their companion members on the outside of the truck, are disposed a plurality of vertical strut members, as 58, which again are preferably welded to the longitudinal frame members. The covering material, as 60, is formed of corrugated metal, as is recommended, and may be secured to the longitudinal transverse frame members as by clips or sheet metal screws.

It is to be noted that bearing pads 26 merely rest upon the upper surface of bushings 22 and do not, themselves, provide any means for definitely holding the top in place. They merely position the same when the vehicle is at rest and when additional securing means are required to prevent loss of the covering when the vehicle is in motion. The locking or securing means is provided in the cam hook members 64 and their associated members. Hook 64 is fixedly secured to the partially rotatable shafts 12 and 14, there being at least one of such hook members on each side margin of the truck body. Hooks 64 engage preferably an anti-friction bearing 68, which is mounted upon a short stub shaft as 70, and provided with side flanges, as 72 and 74, which serve to guide and position the hook during its engagement and after it has been latched in place. Bearing 68 and its associated parts are held in place by two brackets, each bracket being composed of two members, as 80 and 82. These members are fixedly secured by convenient means to shaft 70 at one end and at the other end as will probably be best noted in Figure 4, they are secured, preferably, by welding to the various frame members, as 52 and 54.

Figure 8:
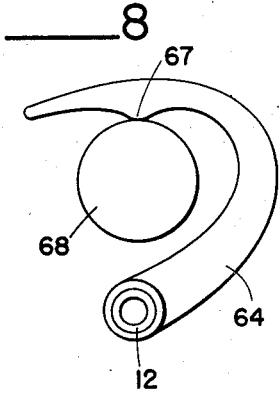
Figure 11:
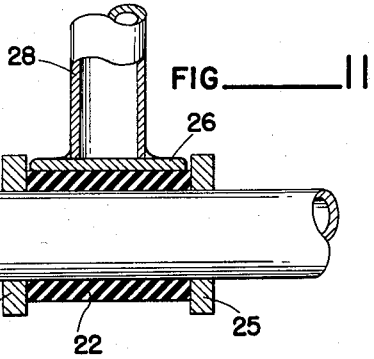
Figure 11 is a longitudinal sectional view, in elevation, showing a typical pivot of which two are normally employed on each side of my top.
Figure 9:
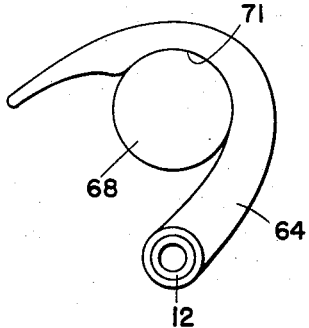

The functioning of hooks 64 is probably best illustrated in the sequential views illustrated in Figures 7, 8 and 9. It is to be noted that as handle 20 is swung in an arc it partially revolves shaft 12 or shaft 14 in accordance with which side is being employed. The illustrations, if considered as being viewed from the back of the truck, would be a showing of shaft 12 and for full engagement with shaft 14 the hook would need to be reversed. In Figure 7 it may be assumed that the hook is engaging tube 12 by means of the extreme end of the hook, as 66. As the point 66 of the hook passes over bearing 68 it begins to move tube 12 upwardly by springing it out of its normal position, after the showing of Figure 6 wherein the bottom of the tube is illustrated by the dotted line 69. In Figure 8 the maximum deflection of shaft 12 occurs when the high point of the cam, as 67, rides over bearing 68. In Figure 9 the bearing 68 is seated within the semicircular curved seat 71 formed in hook 64. This is the secured position for the locking means and because of the resilience of the tubular shafts 12 and 14 and the high point 67 of the cam, a very secure locking means is provided. Actually the locking means must work in conjunction with some seating means, as for instance, the rubber bushings 22 and the arcuate rest portions 26.

In operating my truck body top its preferred position and proportions for use are illustrated in Figure 1. Here it will be noted that the window W of truck T is above the upper extent of my cover. This permits a full vision to the rear by the driver of the truck and at the same time fully protects from the weather and other agencies all the loading which the pickup trucks are normally used to transport.

When it becomes desirable to either load or unload the truck it becomes necessary to have ready access to the truck body B. If the loading was to be made at a curb side then the top would normally be opened so as to hinge from the left side, after the showing of Figure 2. To achieve this positioning control handle 20 of the right hand shaft, as 14, would then be turned toward the center of the truck body and thus disengage hook 64 as would occur in the sequence of Figures 9, 8 and 7. Shaft 12, however, becomes, in effect, the pivot and securing means for the truck body top and shaft 12 revolves with the top, together with all its associated elements, such as bushings 22 and bearing assembly 68, and of course, hook 64 without changing the relationship of these parts with each other. Consequently, it is desirable that bearings 16 and 18 provide an anti-friction pivot for the top. There is no friction between the arcuate rest members 26 and the rubber bushings 22 because they move together as a unit.

Figure 3 shows the truck top pivoted upon shaft 14, however, as shafts 12 and 14 are similar in all respects and both carry the same equipment the operation is as previously explained. Now, if it should prove desirable to remove the cover C completely then in that case both shafts would be revolved, while the cover is in the position of Figure 1, so that both hooks 64 are disengaged from their bearings 68. At this point there is nothing holding the top fixedly in place, it is however resting upon the four bushings 22 and the arcuate rest members 26 but, as will be noted, there is no deterrent to now lifting the entire cover off the truck and this is well within the range of this equipment if the tubular members forming the cover frame are even of steel tubing. Of course if aluminum tubing is used and aluminum covering 60 employed, the weight is such that even one person can handle the top in removing it. To replace the top it would only be again set so that pads 26 engage bushings 22 and in this the collars 24 and 25, which are provided on each end of bushings 22, tend to assist in centering the same and make the precise return of the cover a reasonable achievement for even a single person.

It is believed that it will be clearly apparent from the above description and the disclosure in the drawings that the invention comprehends a novel construction of a detachable top for pickup truck bodies.

Having thus disclosed my invention, I claim:

1. A detachable cover for a vehicle body openable from two opposite sides, comprising: a vehicle body having on each of two opposite sides a shaft which is supported at its ends and free in its intermediate portions, each shaft providing a plurality of journal means spaced apart therealong and said cover having on each side an arcuate pad-like bearing resting on the top portion of each journal and separable therefrom upon upward movement of the associated cover sides whereby either side of said cover may be lifted and pivoted about the shaft on the other side, a manually operable locking hook pivotally supported by each shaft and engaging an anchor member on said cover, said hook having an inner camming surface disposed to engage said anchor member and having a high point past which said anchor member moves during locking and is caught thereby until released by force applied to said hook in an unlocking movement and said hook being disposed on said intermediate portion of said shaft and applying tension to the shaft distorting the same as it acts against the anchor member whereby said bearings are spring tensed against said journals.

2. The subject matter of claim 1 in which said journal means on said shafts are formed of resilient material, said shafts on each side being pivotably supported on said body and having an operating handle thereon and said hook being fixedly secured to said shaft to be moved by said operating handle, and said anchor member on said cover having an anti-friction bearing.

3. A cover for a container openable from two opposite sides comprising: a container and a cover superposed to said container, said cover and said container having therebetween on two opposite sides pivot means permitting lifting of the cover from either side with the opposite side pivoting about the associated pivot means, and manually operable locking means associated with the pivoting means on each side of said container selectively operable to lock the container and cover to a pivotal connection at the pivoting means; said pivoting means includes at each of said sides a revolvable and resilient horizontal shaft, supported at its opposite ends, extending substantially from end to end of said sides and forming a pivotal journal and a plurality of rest member, secured to said cover, engaging said journal and separable therefrom upon lifting of the associated side of said cover; locking means includes a pivotally supported hook and an anchor member disposed to be engaged by said hook and said hook having an inner camming surface adapted to pull on said anchor as the hook is pivoted toward locking and the inner surface having a high point which is passed in the locking movement retaining the anchor member until force is applied to the hook to move the hook past said high point toward disengagement, and said shaft being attached to one of the said locking members and said shaft having some flexibility whereby said hook distorts said shaft by drawing it from normal position as it moves toward locking to provide tension to the locking action.

References Cited in the file of this patent

UNITED STATES PATENTS

| 770,775 | Norris | Sept. 27, 1904 |
| 1,333,464 | Christophersen | Mar. 9, 1920 |
| 2,311,965 | Reynolds | Feb. 23, 1943 |
| 2,510,365 | Barnett et al. | June 6, 1950 |
| 2,690,351 | Giles | Sept. 28, 1954 |

FOREIGN PATENTS

| 329,476 | Great Britain | May 22, 1930 |